E. E. SWEET.
HYDROCARBON MOTOR.
APPLICATION FILED APR. 11, 1917.
1,328,855.
Patented Jan. 27, 1920.
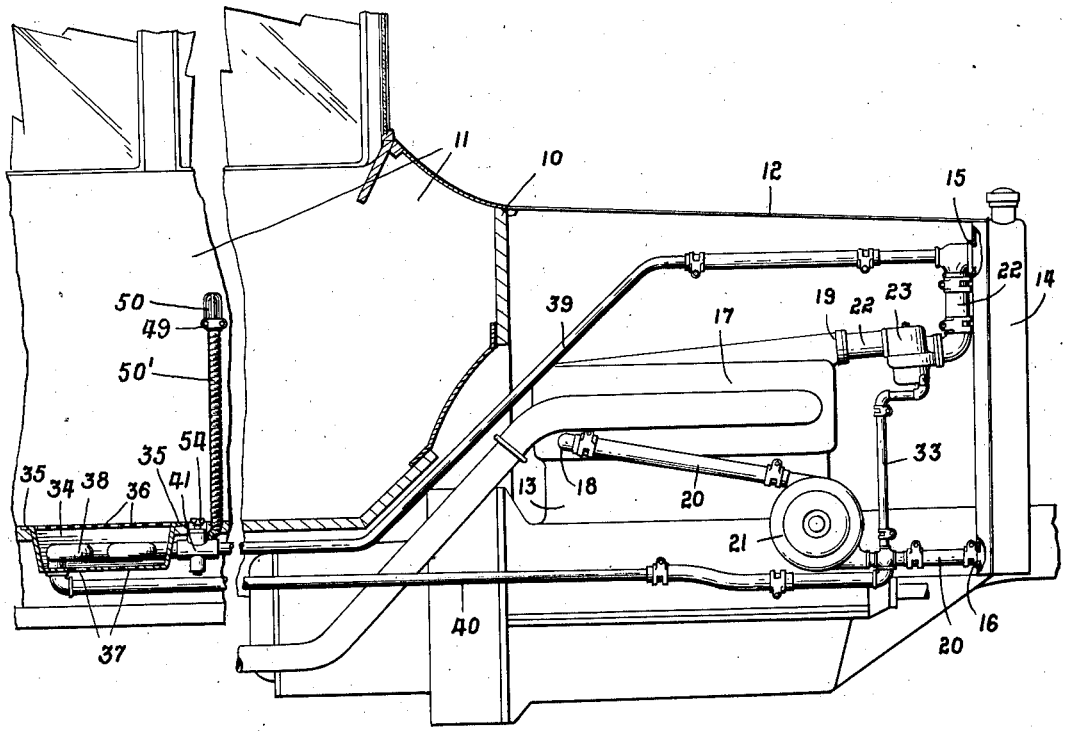
Fig. I.
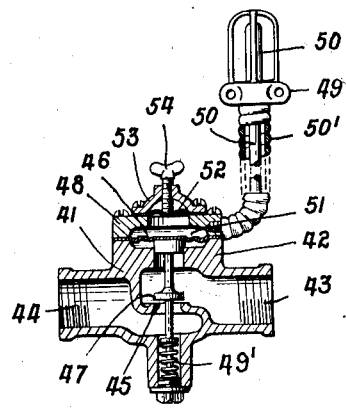
Fig. II.
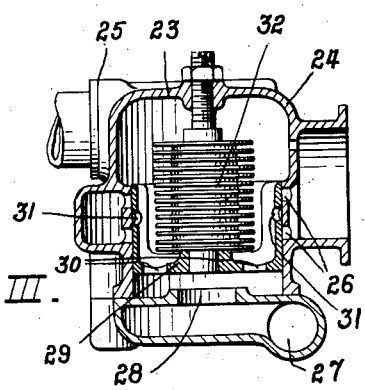
Fig. III.
INVENTOR
ERNEST E. SWEET,
BY
ATTORNEY

UNITED STATES PATENT OFFICE.

ERNEST E. SWEET, OF DETROIT, MICHIGAN, ASSIGNOR TO GENERAL MOTORS COMPANY, OF DETROIT, MICHIGAN, A CORPORATION OF NEW JERSEY.

HYDROCARBON-MOTOR.

1,328,855.   Specification of Letters Patent.   Patented Jan. 27, 1920.

Application filed April 11, 1917. Serial No. 161,200.

*To all whom it may concern:*

Be it known that I, ERNEST E. SWEET, a citizen of the United States, and resident of Detroit, Wayne county, State of Michigan, have invented certain new and useful Improvements in Hydrocarbon-Motors, of which the following is a specification.

This invention relates to improvements in motor vehicles, and more particularly to heating apparatus therefor.

One of the objects of the invention is to utilize the heat developed by the motor for heating the interior of the car body.

Another object of the invention is to provide a vehicle with heating means in which the temperature will be automatically controlled.

Another object of the invention is to so control the circulation of the heating medium that the motor will primarily be maintained at or above a predetermined temperature.

Another object of the invention is to devise a heating means of simple and durable construction.

The various objects, purposes, constructions, principles and advantages involved, will more clearly appear from the following description, taken in connection with the accompanying drawings which form a part of this specification, and in which:

Figure 1 is a longitudinal sectional view of the forward part of a motor vehicle embodying my invention.

Fig. 2 is an enlarged vertical sectional view of the heating coil temperature regulating valve, illustrated in Fig. 1, and Fig. 3 is an enlarged vertical sectional view of the thermostatic circuit controlling valve illustrated in elevation in Fig. 1.

Referring to the drawings, 10 represents a motor vehicle of any design, though shown in the drawings preferably as of the closed body type, and provided with a passenger compartment 11 and a front hood 12, said hood covering a motor 13, suitably supported on the vehicle frame and having a radiator 14, arranged at the extreme front thereof, with inlet and outlet ports 15 and 16, respectively.

The motor 13, is of the water cooled type, having a jacket casing 17 surrounding the cylinders and provided with inlet and outlet ports 18 and 19 respectively, the inlet port 18 being connected by a conduit 20, through a pump 21, with the outlet port 16 of the radiator, and the outlet port 19 of the jacket being connected by a conduit 22 through a thermostatic valve mechanism 23 with the inlet port 15 of the radiator.

The valve mechanism 23 as particularly shown in Fig. 3, comprises a casing 24, having an inlet port 25, an outlet port 26, and a bypass port 27, arranged below a valve seat 28. A valve 29 having openings 30 in the end thereof, and openings 31 in the side wall thereof, is arranged to move vertically in the valve casing over the valve seat 28, and is controlled by a thermostatically operated element 32 connected to said valve and to the top of the casing whereby the valve is operated, according to the temperature of the cooling liquid circulated therethrough, that is, when the cooling liquid is below a predetermined temperature as in winter weather, the thermostatic element 32 is contracted and the valve 29 raised off the seat 28 and over the outlet ports 26 to cover said ports 26, whereby the cooling liquid is directed through the openings 30 in the end of the valve, and through the valve seat opening and bypass port 27 to a bypass conduit 33 to the pipe 20, where it connects with the pump 21 and through said pump and pipe 20 to the motor jacket.

In this manner the cooling liquid is passed through a short circuit and quickly heated to a proper temperature for efficient operation of the motor at which time the thermostatic element 32 will expand and move the valve 29 onto the seat 28, closing the outlet to the bypass port and moving the openings 31 in the side wall of the valve into register with the outlet ports 26, whereby the heated liquid is directed through said outlet ports 26, conduits 22, radiator 14, conduit 20, pump 21 and conduit 20 to the motor jacket.

The liquid when heated sufficiently to be directed through the radiator as above explained, may then be utilized for heating the interior of the vehicle and the apparatus which will now be described, is provided for so utilizing at least a portion of the heat which would otherwise be dissipated in the radiator.

A coil box 34, having a flange 35 around the upper margin thereof, and a grid 36, extending over the top and openings 37 in the bottom thereof, is fitted flush in the floor of the car body 11, in any suitable location. A coil 38, is suitably arranged in the box 34, and has the inlet end thereof connected by a pipe 39 with the conduit 22 at a point intermediate the valve 23 and the radiator. The outlet end of said coil 38 is connected by a pipe 40 with the conduit 20 between the pump 21 and the radiator 14, whereby the water circulated by the pump through the jacket will pass through the pipe 39, the coil 38, and the pipe 40, for heating the interior of the car body after the water in the motor jacket has reached a predetermined temperature as hereinbefore explained.

The heat radiated by the coil 38 is preferably regulated by a thermostatic valve mechanism 41, shown connected in the pipe 39 immediately adjacent the coil 38 to control the passage of water through said heating coil and pipe connections.

The valve mechanism 41 is particularly shown in Fig. 2 as comprising a casing 42 having an inlet port 43 and an outlet port 44, and a valve seat 45 formed in a partition extending across the casing between said inlet and outlet ports, a valve 47 being arranged to move vertically within the casing and operatively connected to a pressure diaphragm 46, secured in place over the top of the valve casing by a cover 48, and having a spring 49' arranged to exert a pressure on the under side of the valve and normally raise the same from its seat to permit passage of the heating medium through the coil and heat the interior of the car body to the desired temperature, when a thermal control mechanism 49 is operated to control the temperature.

The thermal control mechanism 49 comprises a tube 50, located in any convenient place in the interior of the car body, and suitably connected inside a protective conduit 50' with the chamber 51 formed between the diaphragm 46 and the cover 48, said tube being filled with a suitable liquid which will expand with the increase of temperature in the interior of the car body to force the diaphragm 46 down, and close the valve 47 at the desired temperature.

Likewise when the temperature of the interior of the car body lowers the liquid within, the thermal tube will contract and release the pressure upon the diaphragm 46, permitting the valve 47 to raise and heating medium to pass through the coil 38.

The desired temperature within the car body may be readily regulated by adjusting a screw 54, in the cap 53 of the valve mechanism 41, to move the flexible wall 52 and alter the normal pressure exerted within the chamber 51. The screw 54 is preferably placed in a suitable opening in the car body floor for that purpose, so that screwing inwardly will increase the pressure in the thermal tube, and seat the valve at a correspondingly lower temperature.

It will of course be understood that manually operated valves may be included at any points throughout the heating apparatus desired, and furthermore any type or arrangement of heating coil may be used at any desired place in or about the vehicle body without departing from the spirit of my invention, and while I have described and will specifically claim what I deem to be a preferred embodiment of my invention, it will be obvious to those skilled in the art that various modifications and changes may be made without departing from the spirit and scope hereof.

Having thus described my invention, what I claim and desire to secure by Letters Patent is:

1. In an internal combustion engine, in combination, a cylinder jacket, a radiator, connections therebetween, a by-pass around said radiator, a valve mechanism for controlling said radiator and by-pass respectively, and a heater coil, one end of which is connected with the connection between the jacket and radiator between said valve mechanism and the radiator, and the other end with the other of the connections between said jacket and radiator.

2. In an internal combustion engine, the combination with a cylinder jacket having an inlet port and an outlet port, of a radiator having an inlet port and an outlet port, a conduit connecting the jacket outlet port with said radiator inlet port, a valve mechanism intermediate the ends of said conduit, a heater coil one end of which is connected with said conduit intermediate said radiator inlet port and said valve mechanism, a connection between said radiator outlet port and said jacket inlet port, and thermostatically controlled means for controlling the flow through said heater coil.

3. In an internal combustion engine, the combination with a cylinder jacket having an inlet port and an outlet port, of a radiator having an inlet port and an outlet port, a conduit connecting said jacket outlet port and said radiator inlet port, a connection between said radiator outlet port and said jacket inlet port, a by-pass around said radiator, a valve mechanism intermediate the ends of said conduit, a heater coil connected with said conduit intermediate said valve mechanism and said radiator inlet port, thermostatic means for actuating said valve mechanism, and thermostatic means for controlling the flow through said heater coil.

4. In an internal combustion engine, the combination with a cylinder jacket having an inlet port and an outlet port, of a radiator having similar ports, a conduit between said jacket outlet port and said radiator inlet port, a connection between said radiator outlet port and said jacket inlet port, a bypass around said radiator, a thermostatically controlled valve mechanism intermediate the ends of said conduit for directing the circulating medium through said radiator and by-pass respectively, and a thermostatically controlled heater coil one end of which is connected with said conduit intermediate said radiator and said valve mechanism and the other end of which coil communicates with the connection between said radiator outlet port and said jacket inlet port.

5. In an internal combustion engine, the combination with a cylinder jacket, of a radiator, connections therebetween, valve means for controlling circulation between said jacket and said radiator, a heater coil, and thermostatically controlled means connecting said heater coil with one of said connections whereby liquid is conducted through said coil only when the circulation path through said radiator is open.

6. In a motor vehicle, the combination with a motor cooling system comprising a cylinder jacket, a radiator, connections between said jacket and said radiator, and means for controlling the circulation through said radiator, of a heater coil mounted on said vehicle, a conduit between said coil and one of said connections whereby liquid is conducted to said coil only when the path of circulation through said radiator is open, and thermostatic means responsive to variations of the temperature within the vehicle for controlling the circulation through said heater coil.

7. In a motor vehicle, the combination with a motor cooling system comprising a cylinder jacket, a radiator, connections between said jacket and said radiator, and means for controlling the circulation through said radiator, of a heater coil mounted on said vehicle, a conduit between said coil and one of said connections whereby liquid is conducted to said coil only when the path of circulation to said radiator is open, thermostatic means responsive to variations of the temperature within the vehicle for controlling the circulation through said heater coil, and a thermostatically controlled by-pass through which liquid may flow around said radiator without passing therethrough.

In testimony whereof I affix my signature.

ERNEST E. SWEET.